US010726324B2

(12) United States Patent
Buyukkalender et al.

(10) Patent No.: US 10,726,324 B2
(45) Date of Patent: Jul. 28, 2020

(54) RADIO-FREQUENCY ANTENNA CIRCUIT HAVING INTERLOCKING MUTUAL INDUCTORS

(71) Applicant: GEMALTO SA, Meudon (FR)

(72) Inventors: Arek Buyukkalender, Gemenos (FR); Lucile Mendez, Gemenos (FR); Jean-Luc Meridiano, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/576,734

(22) PCT Filed: May 20, 2016

(86) PCT No.: PCT/EP2016/061475
§ 371 (c)(1),
(2) Date: Nov. 24, 2017

(87) PCT Pub. No.: WO2016/188920
PCT Pub. Date: Dec. 1, 2016

(65) Prior Publication Data
US 2019/0042907 A1    Feb. 7, 2019

(30) Foreign Application Priority Data

May 25, 2015   (EP) .................................... 15305783

(51) Int. Cl.
*G06K 19/07*        (2006.01)
*G06K 19/077*       (2006.01)
(Continued)

(52) U.S. Cl.
CPC . *G06K 19/07783* (2013.01); *G06K 19/07775* (2013.01); *G06K 19/07794* (2013.01);
(Continued)

(58) Field of Classification Search
CPC .. H01Q 1/38; H01Q 1/22; H01Q 7/00; G06K 7/10
(Continued)

(56) References Cited

U.S. PATENT DOCUMENTS 5,955,723 A    9/1999  Reiner
6,378,774 B1   4/2002  Emori et al.
(Continued)

FOREIGN PATENT DOCUMENTS

CN    202564549 U    11/2012
EP    1 924 959 A1    5/2008
(Continued)

OTHER PUBLICATIONS

"Analytical computation of distributed capacitance for NFC coil antenna" to Jin et al. published at IEICE Electronics Express, vol. 14, No. 2, 1-9.*
(Continued)

*Primary Examiner* — Daniel A Hess
(74) *Attorney, Agent, or Firm* — Buchanan Ingersoll & Rooney PC (57) ABSTRACT

The invention relates to a radiofrequency antenna circuit comprising at least one electrically conductive portion, in particular in the form of a track or wire, forming a first spiral having first turns and two end portions. The invention includes a second spiral extending substantially away from one of the end portions, along and between the turns of said first spiral. The invention also relates to a radiofrequency device comprising the antenna circuit.

14 Claims, 5 Drawing Sheets

(51) Int. Cl.
*H01Q 1/22* (2006.01)
*H01Q 7/00* (2006.01)
*H01Q 1/38* (2006.01)

(52) U.S. Cl.
CPC ............. *H01Q 1/2225* (2013.01); *H01Q 1/38* (2013.01); *H01Q 7/00* (2013.01)

(58) Field of Classification Search
USPC ........................................................ 235/492
See application file for complete search history.

(56) References Cited

U.S. PATENT DOCUMENTS

| 2003/0019941 | A1 | 1/2003 | Altwasser et al. |
| 2012/0208474 | A1 | 8/2012 | Deguchi et al. |
| 2017/0271757 | A1* | 9/2017 | Kato ..................... G06K 19/07 |

FOREIGN PATENT DOCUMENTS

| EP | 2 490 294 A1 | 8/2012 |
| EP | 20490 291 A1 | 8/2012 |
| EP | 2 710 523 A1 | 3/2014 |
| JP | H11-078325 A | 3/1999 |
| JP | 2014-515151 A | 6/2014 |
| WO | 2012/156403 A1 | 11/2012 |

OTHER PUBLICATIONS

*International Search Report (PCT/ISA/210) dated Aug. 5, 2016, by the European Patent Office as the International Searching Authority for International Application No. PCT/EP2016/061475.
*Written Opinion (PCT/ISA/237) dated Aug. 5, 2016, by the European Patent Office as the International Searching Authority for International Application No. PCT/EP2016/061475.
Office Action (Notice of Reasons for Rejection) dated Jan. 29, 2019, by the Japanese Patent Office in corresponding Japanese Patent Application No. 2017-560951 and English translation of the Office Action. (7 pages).
The First Office Action issued by The State Intellectual Property Office of People's Republic of China in corresponding Chinese Patent Application No. 201680030272.3 dated Apr. 3, 2019 (12 pages including partial English translation).

* cited by examiner

Equivalent Circuit

RADIO-FREQUENCY ANTENNA CIRCUIT HAVING INTERLOCKING MUTUAL INDUCTORS

The invention relates to the field of radio frequency transponders with antenna and the structure of these radio-frequency transponders.

More particularly, the invention may concern contactless chip media, such as contactless chip cards, or a passport, the communication of which is amplified by a passive antenna (or relay antenna).

The invention may also relate to contactless electronic travel document systems, such as electronic passports and electronic visas in the form of transponders disposed together. In particular, these documents and visas are in accordance with the specifications of the ICAO (International Civil Aviation Organisation) and ISO/IEC 14443.

The invention may concern radio-frequency transponders in various frequency ranges, in particular UHF. Radio-frequency transponders may comprise spiral antennas and/or ones associated/coupled with antennas of the dipole type.

Figure 1:
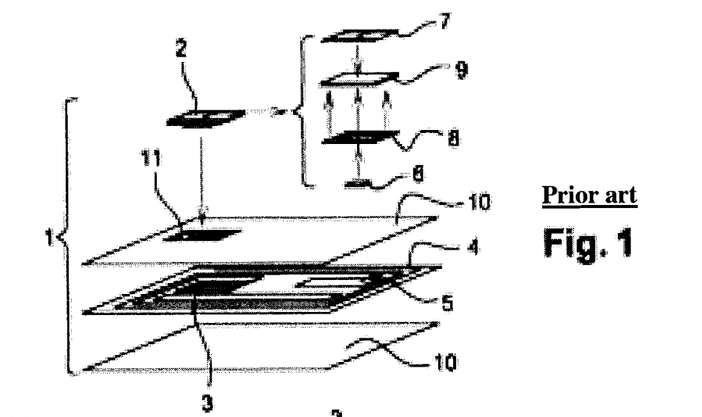
FIGS. 1 and 2 illustrate a chip card with dual interface according to the prior art.
Figure 2:
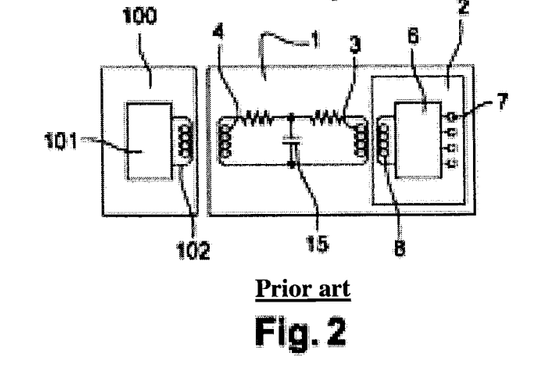

The document U.S. Pat. No. 6,378,774, illustrated in FIGS. 1 and 2, describes a chip card comprising an integrated-circuit module (2) with communication interfaces with contacts and antenna. The card body comprises a passive antenna that comprises two coils (3, 4) connected in parallel to a capacitor, a closed wide coil being able to be disposed substantially at the periphery of the card body and a narrow coil disposed centred with the antenna of the module. The function of the wide coil is to communicate vis-à-vis an external reader and the function of the narrow loop is to be coupled electromagnetically and to communicate with the module.

These media have the drawback, because of the use of a passive main antenna with two loops in the form of an eight, of having a complex design.

The document U.S. Pat. No. 5,955,723, illustrated in FIG. 3, describes a data carrier comprising an integrated circuit 16 connected to a first conductor loop 18, at least a second conductive loop 14 with a coupling surface corresponding approximately to that of the support, and a third loop 13 belonging to the second loop and having approximately the dimensions of the first loop. The first and third loops are disposed substantially concentrically and are coupled together. In an embodiment illustrated in FIG. 3, the third loop is open towards the outside. It corresponds to a recessed or concave re-entrant portion of the first loop coming from the outside to the inside of the coupling surface delimited by the internal surface of the antenna 14.

The carrier obtained has the drawback of requiring a passive antenna, the main loop of which extends over the entire periphery of the carrier. Furthermore the designs described do not make it possible to achieve a required level of performance in accordance with ISO/IEC 14443, ICAO and/or EMV.

An embodiment from the SPS (Smart Packaging Solutions) company is also known, which uses a contact module with an antenna disposed in a cavity in the banking-chip card body. This module is coupled with a passive antenna disposed over almost the entire surface of the card body. It comprises substantially concentric loops disposed in a spiral around the cavity of the module. The first loop adjacent to the cavity being very wide, several millimetres, under the location of the module cavity, or even 5 mm, and the following ones also to allow a protrusion on the turns without risk of cutting the turns at the protrusion. Furthermore, the antenna is connected to metal capacitor plates disposed on either side of the antenna support. The last turn extends at the periphery of the card in order to take up the most radio-frequency flux of a reader.

This design has the drawback of presenting risks of delamination since the plastic sheets constituting the card body do not adhere well to the metal surfaces of the turns of the antenna and/or capacitor plates.

The patent application EP 2 710 523 A1 is also known, aimed at solving the aforementioned problems and proposing an antenna on a half-surface of a chip card to the ISO 7816 format (the bank card format) and coupling between the passive antenna and a chip card module with antenna on a portion of the passive antenna in the form of a U. The device in this figure has the drawback of using an antenna etched on two faces of a substrate and using a not insignificant surface area of the substrate devoted to capacitor plates.

The patent application EP 1924959 A1 is also known, proposing a radio-frequency transponder comprising a radio-frequency chip connected to a wire antenna on a single substrate face, in which the capacitor is obtained by varying the inter-turn space on at least a portion of the antenna so as to form a capacitor of the inter-turn type.

Varying the separation between the turns may require a surface available on the support reserved for the antenna that is too great, at least at certain points.

The patent application EP 2 490 294 describes a radio-frequency reader antenna for supplying energy to an RFID tag or a contactless chip card. The antenna comprises two interlocking coils, one for excitation and the other for the transmission/reception of data. The two coils are independent and without continuity with respect to each other.

The invention aims to solve the aforementioned drawbacks.

In particular, it relates to a design of the passive or normal radio-frequency transponder antenna that is simpler to produce industrially while keeping high-performance radio-frequency properties.

The invention also aims to use less metal surface for the passive antenna and/or the associated capacitor, in particular for economy of etched conductive surface.

To this end, the subject matter of the invention is a radio-frequency antenna circuit comprising at least one electrically conductive portion in particular in the form of a track or wire, forming a first spiral with first turns and two end portions. The circuit is distinguished in that it comprises a second spiral extending from one of the end portions, along and between the turns of said first spiral.

By virtue of these provisions, it is possible to form a capacitance (or capacitor) associated with a transponder antenna circuit or passive antenna circuit, between the tracks or turns of the antenna circuit itself and preferably on the same face of the insulating substrate. Furthermore, the surface area required for achieving standard communication performances, in particular ISO/IEC 14443 and EMV, is minimised optimally.

According to other features or embodiments:

The first spiral (S1) has a first normal (or positive—for example 2 µH) inductance and the second spiral has a second higher inductance. It may be at least ten times greater in absolute value (for example equal to −38 µH).

The radio-frequency antenna circuit comprises at least two spiral portions S1 and S2 interlocking in each other.

The radio-frequency antenna circuit comprise interlocking spirals forming mutual or reciprocal inductors.

The second spiral (S2) is equivalent to or confers a capacitance/capacitor value C (for example a spiral S2 of (−38 µH) confers substantially the equivalent of a capacitance of 33 pF).

The first inductance spiral (S1) is formed by turns wound substantially in one plane in a first direction (E), having an inter-turn space, and the second spiral (S2) comprises one turn disposed inside this inter-turn space, wound in a second direction opposite to the first direction.

Alternatively, the first spiral (S1) is formed by turns wound substantially in one plane in a first direction (E), having an inter-turn space, and the second spiral (S2) comprises one turn inside this inter-turn space, wound in a second direction (E) identical to the first direction.

The circuit comprises at least one jump between the first and second spirals as from an end portion of the first spiral or from at least one first turn from inside the outside (or the exit) of the first spiral (S1) (or vice versa) towards the inside of the spiral (S1).

The jump takes place on at least one to ten turns of the first spiral (S1) with normal inductance.

The circuit comprises a jump from the internal turn as far as the last or penultimate external turn of the first spiral (S1) with normal inductance.

The circuit has an equivalent capacitance equal to 33 pF (or inductance of the second spiral of (−33 µH) with a total of approximately 3.5 spiral turns with a second (high) inductance and four spiral turns with normal inductance on a surface substantially equal to half-surface of a chip card to the ISO 7816 format. Normal inductance is equal to 2 µH.

Another subject matter of the invention is a radio-frequency device comprising a radio-frequency chip and the aforementioned radio-frequency antenna circuit.

According to other features:

The device comprises a passive antenna circuit and at least one radio-frequency chip transponder coupled electromagnetically with said passive antenna circuit and is characterised in that said passive antenna circuit comprises the aforementioned radio-frequency antenna circuit.

The coupling surface of the passive antenna (A) preferably extends over a surface area that is approximately equal to 81×25 mm or less than half the surface area of a chip card to the ISO 7816 format.

Other particularities and advantages of the invention will emerge from a reading of the description given by way of non-limitative example with regard to the accompanying drawings, in which.

FIGS. 1-4 of the prior art were described previously in the introduction.

The passive antennas are respectively referenced (3, 4) and (13, 14). They comprise respectively a small loop (3, 13) and a large loop (4, 14).

Figure 3:
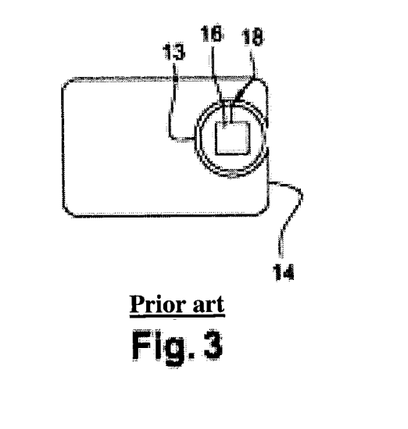
FIG. 3 illustrates a contactless chip card of the prior art.
Figure 4:
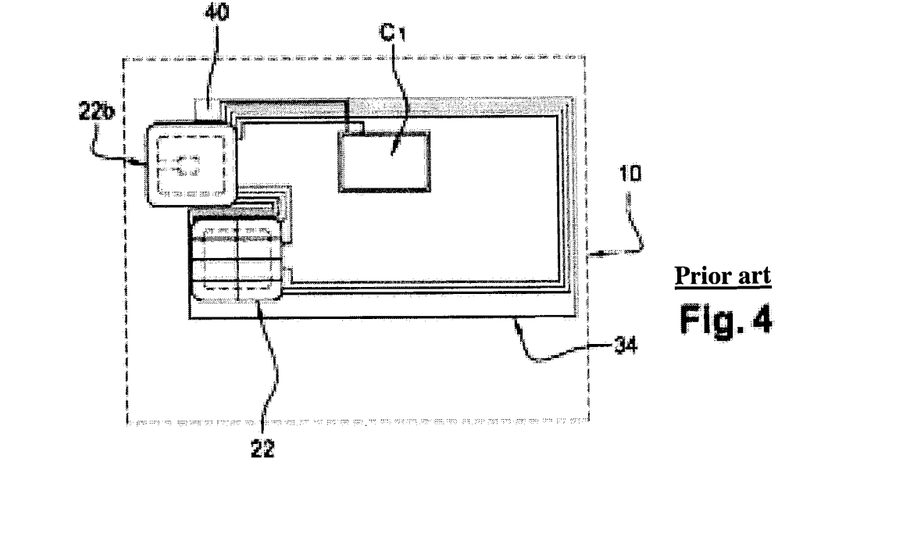
FIG. 4 illustrates a contactless chip card of the prior art solving the prior-art problems of FIGS. 1 to 3.

In FIG. 3, the electromagnetic flux induced in the loop 14 is contrary to the one induced in the loop 13 and may be detrimental to the efficacy of the electromagnetic coupling.

Figure 5:
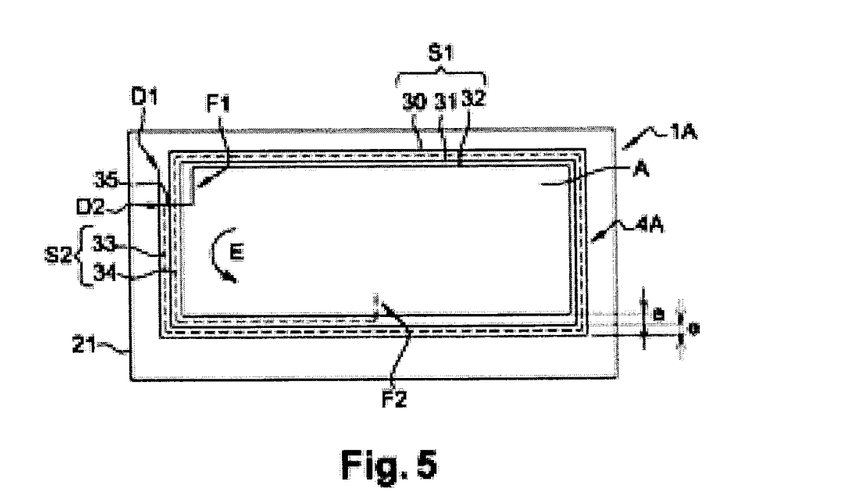
FIG. 5 illustrates a schematic view of an antenna circuit in accordance with a first embodiment of the circuit of the invention.

FIG. 5 shows schematically a radio-frequency device 1A comprising a radio-frequency antenna circuit 4A in accordance with a first embodiment of the invention.

According to the invention, the antenna circuit comprises at least one electrically conductive portion in particular in the form of a track, wire, winding, turn or coil forming a first spiral with normal inductance.

The first spiral (S1) comprises first turns and two end portions.

In the example, the spiral S1 (in a solid line) comprises turns 30, 31, 33 and is produced as an electrically conductive wire with an insulating sheath (enamel) overlaid by ultrasound technique. The inter-turn spacing is approximately 600 µm.

This spiral S1 has here a normal (or positive) inductance of approximately 2 µH, measured between points A and B by means of an impedance bridge with a frequency at 13.56 MHz and with a voltage of 100 mV, having previously cut the connection 35 (jump in turns) between the spiral S1 and S2.

Other techniques for producing an antenna may be suitable, such as conductive-wire embroidery, etching, or printing of conductive material. Where applicable an insulating bridge may be required to cross turns as indicated below.

According to one feature of a first preferred embodiment, the circuit comprises a second spiral (S2) extending from one of the end portions B, C (or from the bridge 35), along and between the turns of said first spiral S1. This definition is illustrated by various embodiments described hereinafter.

The radio-frequency antenna circuit according to the invention comprises at least two spiral portions S1 and S2 interlocked in each other.

The invention forms a radio-frequency antenna circuit with mutual interlocked inductances.

The radio-frequency antenna circuit comprises interlocked spirals forming mutual or reciprocal inductances.

It will be seen hereinafter in various embodiments described that the antenna circuit of the invention may be such that the normal antenna travel remakes turns S2 in the same spiral direction towards the inside whereas the spiral travel ends inside the spiral S1.

The spiral travel S2 can thus be arranged so as to remake one or more turns in the direction oriented so as to emerge (or tending to emerge) from the spiral S1 (towards the outside whereas the point of travel is situated close to the outside of S1 or is oriented towards the exit of S1).

This first preferred embodiment may be independent of the various designs or various arrangements of the first spiral with respect to a second spiral, given solely as an example. This first embodiment may also be independent of the character of the second (high) inductance of the second spiral.

According to one feature of a third preferred embodiment of the invention, the antenna circuit 4A comprises at least one electrically conductive portion in the form in particular of a track or wire, winding, turn or coil arranged so as to constitute a second spiral S2 with a second (high or negative) inductance. The second spiral comprises the turns in broken lines 33 and 34 and extends along the spiral S1 from a jump 35 in turns.

Figure 5A:
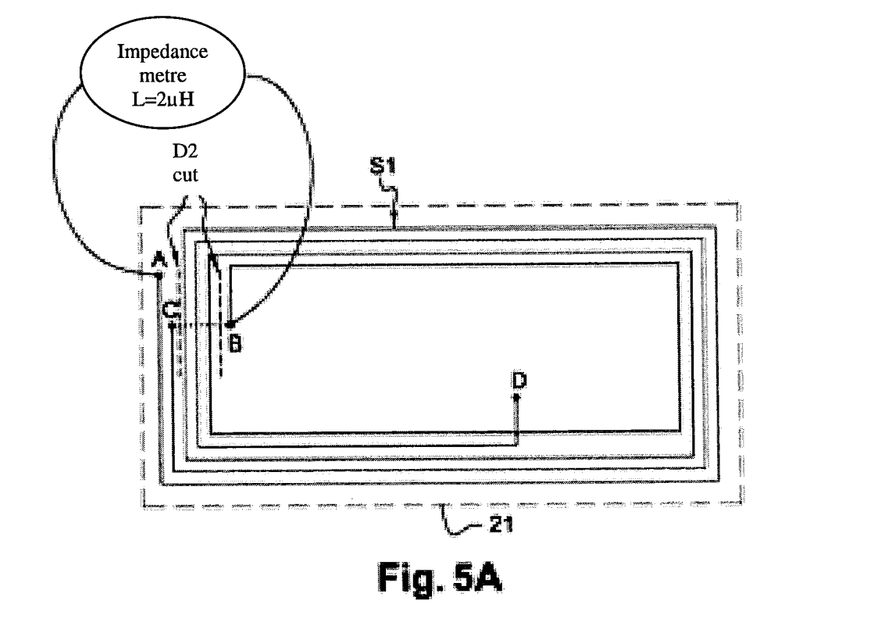
FIGS. 5A and 5B illustrate a bench for measuring inductance of the first spiral and second spiral.
Figure 5B:
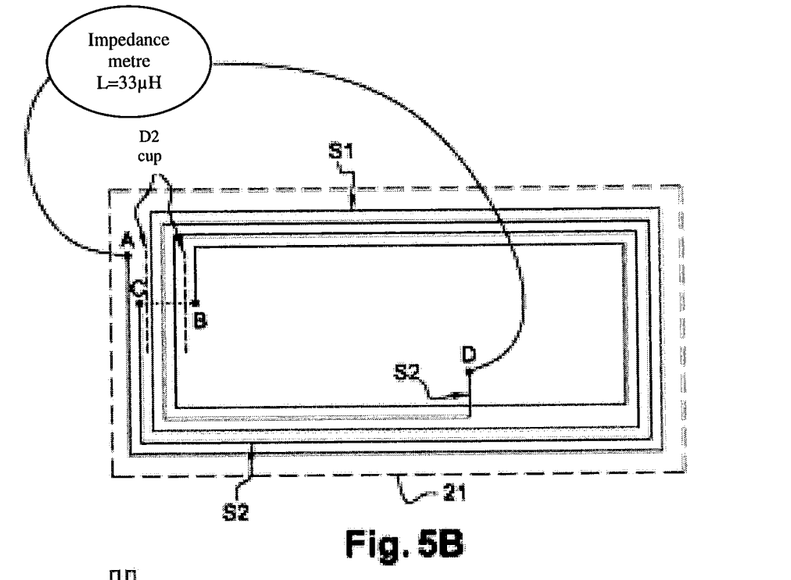

The spiral with the second (high or negative) inductance is measured by means of an impedance bridge at a frequency of 13.56 MHz and a voltage of 100 mV, as shown by FIG. 5A, having previously cut the connection 35 between the spirals S1 and S2.

A value −33 μH (microhenries) is then measured between points C and D on the spiral S2.

Consequently, by virtue of this spiral S2 with a second (high or negative) inductance, the total circuit 4A (S1+S2) has a resonant frequency of 15.2 MHz on the antenna.

Figure 5C:
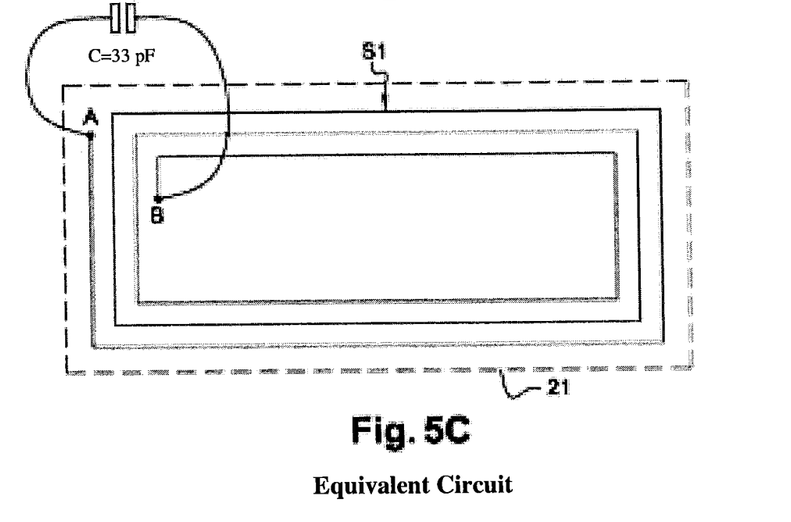
FIG. 5C illustrates a circuit equivalent to the antenna in FIGS. 5, 5A, 5C in which the spiral S2 is replaced by a capacitance, the value of which is tested by trial and error in order to obtain the same effect as the combined one of S1 and S2 together in FIGS. 5, 5A, 5C.

In order to determine the equivalent capacitance created with the second antenna S2, a physical capacitor is then soldered onto the spiral S2 between points A and B so as to obtain the same resonant frequency of 15.2 MHz obtained with the complete circuit 4A. Here it was necessary to weld on a capacitor with a value of 33 pF (picofarads).

Thus, according to one feature of the radio-frequency antenna circuit 4A, the second spiral with a second (high or negative) inductance S2 confers an unexpected very high capacitance/capacitor value. This equivalent capacitor of 33 pF formed by the spiral S2 (or second/high inductance of S2) makes it possible to frequency-tune the passive antenna circuit S1 surprisingly with the minimum surface area occupied on the substrate 21.

According to the tests the result is that a second (high and/or negative) inductance of −38 μH produces an equivalent effect, at least in terms of resonant frequency, to that of a capacitance equal to approximately 33 pF connected to the end terminals A, B of the antenna (or spiral) S1.

According to one feature of the preferred embodiment, the first spiral with inductance S1 of the antenna circuit 4A is formed by turns wound substantially in one plane in a first direction, having an inter-turn space (e), and the second spiral with a second (high and/or negative) inductance S2 is disposed inside this inter-turn space (e), wound in a second direction identical to the first direction.

In the example, the circuit is formed or deposited on the same face of a substrate 21 made from plastic material, PET, PVC, polycarbonate, plastic material of the "Teslin" brand, paper, etc. The antenna is at least partially buried under the surface level of the substrate.

The spiral S1 is wound in the anticlockwise direction (E), from a starting point "D1" situated outside the antenna circuit 4A or spirals 4A as far as a point "F1" internal to the spiral S1.

The inter-turn spacing (e) of the turns 30, 31, 32 is here 600 μm.

Next, the antenna circuit 4A extends from the point F1 towards the outside of the spirals 4A, crossing two turns 30, 31 of the spiral S1.

Next, the travel continues with a second spiral S2 in broken lines with antenna turns that extends in this inter-turn space (e) of the first antenna S1. The travel takes place in the same direction (E), anticlockwise, as the spiral S1.

Alternatively, according to a second embodiment, the second spiral S2 with a second (high and/or negative) inductance is disposed inside this inter-turn space (e), but wound in a second direction opposite to the first direction (E) of a first spiral S1. (See however a preferred variant in FIG. 9 of this second embodiment).

Although possible, this second embodiment is a little less preferred since it may be less efficient, in terms of radio-frequency communication, probably because of an electromagnetic flux generated by the second or secondary spiral S2 reversed with respect to the flux generated by the first or main spiral S1.

According to one feature of the preferred embodiment, the radio-frequency antenna circuit comprises a jump 35 of at least one turn from the inside 32 towards the outside of the first spiral S1 and then the formation of the second spiral S2 parallel to the first spiral S1 and in the direction of the inside of the first spiral S1.

In the example, the jump in turns is made by a portion 35 between the two spirals S1, S2. This portion crosses, from the inside to the outside of the antenna 4A, turns 30, 31 in order to be positioned between the two last peripheral turns of the antenna 4A. Alternatively, the jump may go further beyond the last peripheral turn 33.

The jump may go from the inner turn 32 as well as the last or penultimate outer turn of the first spiral with normal inductance.

The turn 34 loops back towards the inside of the antenna 4A to a final point F2 from a starting point D2 after the bridge 35. Here the turn 34 stops its travel at a level situated between two turns of the spiral S1.

However, this turn could continue as far as the bridge 35 and even beyond, forming at least one internal turn or several.

This makes it possible to increase the equivalent capacitance created if the latter is not sufficient.

According to one feature, the jump may take place towards the outside over at least one to ten turns of the first spiral with normal inductance.

In the example, in order to achieve the capacitance and inductance values indicated hereinafter, the jump is of four and a half turns.

According to one feature of this preferred embodiment, the radio-frequency antenna circuit has an equivalent capacitance equal to 33 pF with a total of 3.5 turns of a spiral at second (high and/or negative) inductance and four turns of a spiral at normal inductance over a surface area substantially equal to a half-surface of a body 121 of a chip card to the ISO 7816 format.

The copper wire has a diameter of approximately 112 μm.

The external dimensions of the radio-frequency antenna are 81×25 mm. These dimensions may be less, or even greater within the limit of class 1 defined by ISO 14443-1.

Figure 9:
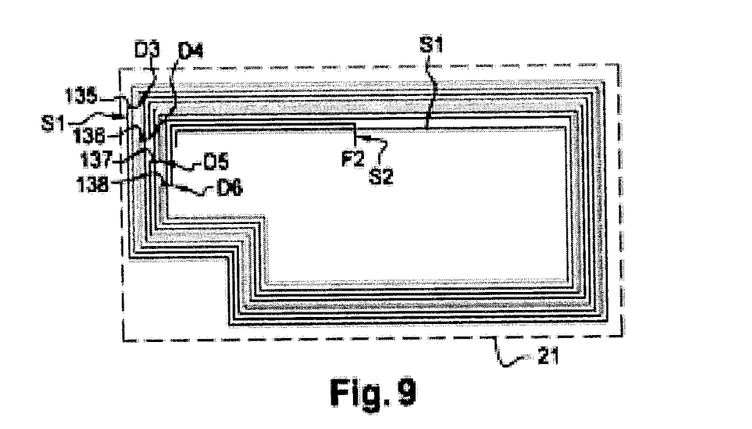
FIG. 9 illustrates a third embodiment of a radio-frequency device with passive antenna using two types of spiral, the spiral S2 comprising a plurality of jumps towards the inside of the first spiral S1.

In FIG. 9 a third embodiment of a spiral arrangement makes provision for forming the second spiral S2 from the external end portion of the first spiral S1 at the starting point D3 (such as the position A of S1 in FIG. 5A).

A jump (or bridge) 135 is made towards the inside of the first spiral S1 by jumping one turn, and then the first outer turn of S2 extends between the turns of S1 so as to turn in the spiral S1 towards the outside of the spiral S1 as far as the bridge 135 or before regaining the bridge 135.

Next, just before reaching the first jump or bridge 135, the spiral S2 makes another jump 136 from the second starting point or change-of-direction point D4 towards the inside of the spiral S1, as before jumping another turn of the spiral S1. Next, the spiral S2 turns in the direction of the outside (or exit) of the spiral as before until it reaches the bridge 136 or before the bridge 136.

The identical procedure to the previous one is followed for the jumps 137 and 138 from respectively new starting points D5, D6 as well as the final point F2 situated inside the spiral S1.

This embodiment has the not insignificant advantage of allowing elimination of a double wire jump over the travel of the second spiral S2.

Alternatively, each jump of one turn towards the inside of the spiral S1 may be replaced by a jump of two or n turns of S1.

The device 1A, 10A, 20A (FIGS. 5 to 7) is here in the example an insert (or inlay) of a contactless chip card and/or of the contact type in accordance with ISO 7816 and ISO/IEC 14443. It may constitute a subassembly of an electronic passport or other contactless object such as an electronic tag, a badge, a travel ticket, etc.

Figure 7:
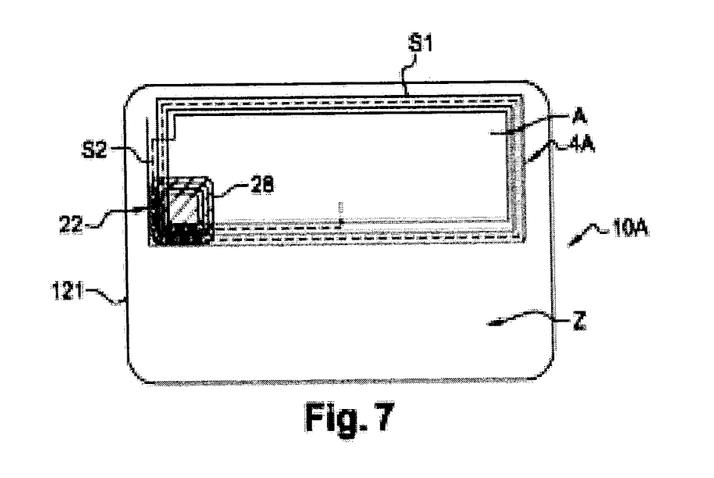
FIG. 7 illustrates a second embodiment of a radio-frequency device with passive antenna using the antenna circuit of FIG. 5.

The antenna circuit 4A is here a passive antenna tuned or intended to be tuned for frequency with at least one radio-frequency transponder 22 or 22b (FIG. 7). The transponder 22 comprises a radio-frequency integrated circuit chip connected to an antenna interface 28 (here shown schematically). The transponder may in the example be a module with a dual interface 22 (antenna and contact pads on the surface of the card body) or a contactless module of a chip card 22b (FIG. 7B).

In general terms, in the context of the present description, transponder means any radio-frequency electronic circuit communicating by means of an electromagnetic field and comprising a coil connected to a capacitor and/or to an integrated circuit.

Transponders are used in various economic fields such as banking (electronic purse), communication, transport or identity (e-passport, ID card). In identity in particular, identifying a person by radio-frequency communication with a contactless portable electronic object of the RFDI type is known.

The module 22 may or may not comprise an insulating substrate supporting contact pads and/or the antenna.

The passive antenna 4A comprises a single main loop formed by a plurality of turns. It comprises at least one surface portion (A) inside the loop for effecting electromagnetic coupling with at least one transponder circuit.

Preferably, for better coupling results and performances satisfying in particular the tests of ISO/IEC 14443 and EMVCo, a plurality of turns of the passive antenna 24 extend or are intended to extend substantially in the vicinity of and along the interface 28 of the modules 22 on at least half of their periphery (P).

Figure 6:
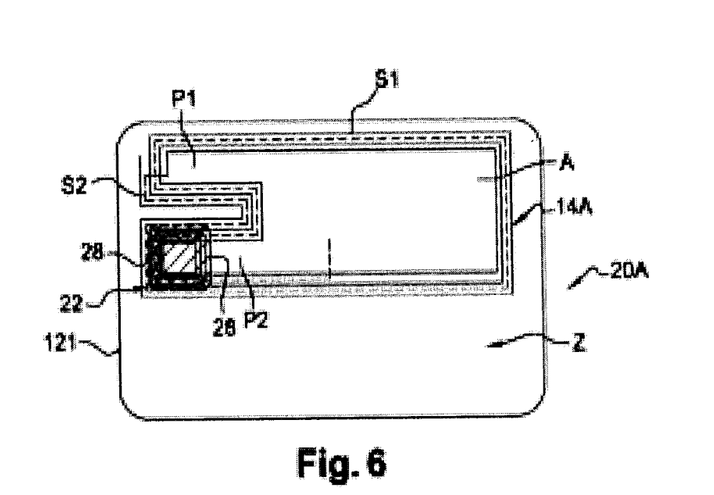
FIG. 6 illustrates a first embodiment of a radio-frequency device with passive antenna using the antenna circuit of the previous figure.

In FIG. 6, the device 20A is substantially identical or similar to the device in FIG. 7 (the same reference numbers represent the same elements or similar).

The antenna circuit differs from the one in FIG. 5 or 7 in that it comprises two bulges or protuberances P1, P2 allowing electromagnetic coupling with two antenna modules or in two positions as required.

In the embodiments the antennas 4A may be situated outside and above the standardised protrusion zones of chip cards of the banking type.

The entire bottom surface Z of the card, which corresponds substantially to a bottom half-surface of the card, is available in particular for spaces for other components such as a keypad, a display window of the dynamic CW type, a fingerprint sensor, a switch, etc.

Figure 8:
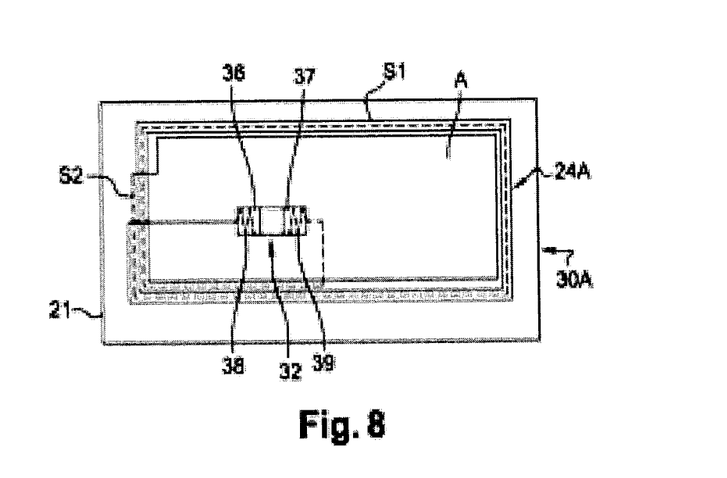
FIG. 8 illustrates a first embodiment of a simple radio-frequency transponder device using an antenna circuit according to the invention.

In FIG. 8, the invention provides a radial-frequency device comprising a radio-frequency chip and the radio-frequency antenna circuit 24A substantially in accordance with the invention and with one of the embodiments described previously.

This antenna circuit 24A does however differ in that it is designed to directly connect a radio-frequency chip or a module 32 comprising it as in the example. The antenna 24A is directly a transponder antenna 30A.

The module 32 comprises two electrically conductive interconnection areas 36, 37 for connecting end portions 38, 39 of the antenna 24A. These end portions are here in the form of zigzags.

The devices 1A, 10A, 20A, 30A may comprise one or more covering or decoration sheets or film for compensation of thickness on one or both faces of the substrate 21 so as to constitute a finished or intermediate product that can serve as a subsequent insert. The films or sheets may be in any known material.

Concerning FIGS. 6 and 7, the covering sheet may comprise a cavity for receiving the antenna module.

Thus the invention may create a second (high and/or negative) inductance that is considered to be a capacitor C (or equivalent) in particular in an operating mode of communication or operation at fixed frequency.

Studies or tests have shown that $-38\ \mu H$ is approximately equivalent or equal to 33 pF.

By virtue of the invention, it is possible to multiply or considerably increase the second (high and/or negative) inductance and to obtain a high input capacitance without requiring many winding turns.

It has been considered that the length of the bridges (35, 135-138) is negligible compared with the length of the second spiral S2 or considered to be a buffer portion between the spirals S1 and S2. Where applicable, the bridges may be considered to be integrated in the second spiral S2.

The surface area occupied by the antenna 24A on the substrate 21 is identical or greater than in the prior art.

In the above examples, the second inductance of the spiral S2 may have a very high value (compared with that of S1) (at least in absolute value) more than five or ten times greater, or even preferably more than fifteen times or twenty times the value of the inductance of the spiral S1.

In a priori findings, it is observed that the spiral S2 in FIG. 5 or 8 has a tendency to generate a current in S2 flowing in an opposite direction to the one travelling through S1.

It is observed that the spiral S2 in FIG. 9 has a tendency to have a current running through it travelling in the same direction as the one travelling through S1, but with a delay in each turn of S2 with respect to the current flowing in the turns adjacent to each turn of S1.

It is observed that the second spiral S2 may interlock in the spiral S1 in various ways. Preferably, each turn of the second spiral S2 is interlocked (or is introduced) between two consecutive turns of the first spiral S1. Thus an alternation of turns is observed belonging to two distinct spirals in the antenna circuit.

The invention is differentiated from the antenna designs generating an inter-turn stray capacitance since this type of stray capacitance is in general negligible compared with the value of a capacitance generated by the invention in S2.

The invention claimed is:

1. A radio-frequency antenna circuit for contactless chip support, comprising at least one electrically conductive portion in particular in the form of a track or wire, forming a first spiral with a plurality of first turns and two end portions, further comprising a second spiral physically connected to one of the end portions of said first spiral via a bridge that crosses at least one turn of at least one of the spirals, wherein said second spiral extends along and between the turns of said first spiral.

2. A radio-frequency antenna circuit according to claim 1, wherein the first spiral has a first positive normal inductance and the second spiral has a second inductance at least ten times greater in absolute value.

3. A radio-frequency antenna circuit according to claim 2, wherein the second spiral is equivalent to or confers a capacitance/capacitor value.

4. A radio-frequency antenna circuit according to claim 3, wherein the bridge comprises at least one jump between the first and second spirals from an end portion of the first spiral or of at least one first turn from the inside towards the outside of the first spiral or vice versa.

5. A radio-frequency antenna circuit according to claim 4, wherein said jump takes place over at least one to ten turns of the first spiral with normal inductance.

6. A radio-frequency antenna circuit according to claim 1, wherein the first spiral with positive inductance is formed by turns wound substantially in one plane in a first direction, having an inter-turn space, and the second spiral comprises one turn disposed inside this inter-turn space, wound in a second direction opposite to the first direction.

7. A radio-frequency antenna circuit according to claim 6, wherein the bridge comprises a jump from the inner turn as far as the last or penultimate outer turn of the first spiral with normal inductance.

8. A radio-frequency antenna circuit according to claim 6, and having an equivalent capacitance equal to 33 pF with a total of 3.5 spiral turns with second inductance and four spiral turns with first normal inductance equal to 2 µH over a surface area substantially equal to a half-surface of a chip card to the ISO 7816 format.

9. A radio-frequency antenna circuit according to claim 1, wherein the first spiral is formed by turns wound substantially in one plane in a first direction, having an inter-turn space, and the second spiral comprises one turn inside this inter-turn space, wound in a second direction identical to the first direction.

10. A radio-frequency device comprising a radio-frequency chip and the radio-frequency antenna circuit according to claim 1.

11. A radio-frequency device, comprising a passive-antenna circuit and at least one transponder with a radio-frequency chip coupled electromagnetically with said passive-antenna circuit,
wherein said passive-antenna circuit comprises the radio-frequency antenna circuit according to claim 1.

12. A device according to claim 11, wherein the coupling surface of the passive antenna or transponder antenna preferably extends over a surface area that is approximately equal to 81×25 mm or less than half of the surface area of a body of a chip card to the ISO 7816 format.

13. A radio-frequency antenna circuit according to claim 1, wherein the second spiral comprises a plurality of second turns.

14. A radio-frequency antenna circuit according to claim 1, wherein each of the plurality of first turns is shaped to form two protuberances.

* * * * *